(12) United States Patent
Yonezawa

(10) Patent No.: US 6,857,537 B2
(45) Date of Patent: Feb. 22, 2005

(54) HEAT INSULATION PLATE MOUNTING STRUCTURE ON FUEL TANK

(75) Inventor: Kenji Yonezawa, Kanagawa (JP)

(73) Assignee: Piolax Inc., Yokohama (JP)

( * ) Notice: Subject to any disclaimer, the term of this patent is extended or adjusted under 35 U.S.C. 154(b) by 1 day.

(21) Appl. No.: 10/407,188

(22) Filed: Apr. 7, 2003

(65) Prior Publication Data

US 2003/0198506 A1 Oct. 23, 2003

(30) Foreign Application Priority Data

Apr. 8, 2002 (JP) ........................................ 2002-105284

(51) Int. Cl.[7] ................................................ B65D 6/00
(52) U.S. Cl. ..................................... 220/562; 220/4.14
(58) Field of Search ............................... 220/562–564, 220/4.13, 4.14, 900, 905; 280/830, 835

(56) References Cited

U.S. PATENT DOCUMENTS

| | | | | |
|---|---|---|---|---|
| 3,742,995 A | * | 7/1973 | Confer et al. ............... 220/660 |
| 4,023,257 A | * | 5/1977 | Wright et al. ................. 29/460 |
| 5,067,575 A | * | 11/1991 | Hyde et al. ................ 180/69.4 |
| 5,193,262 A | * | 3/1993 | Hyde et al. .................... 29/447 |
| 6,435,365 B2 | * | 8/2002 | Pachciarz et al. .......... 220/4.14 |
| 2002/0121517 A1 | * | 9/2002 | Aoki et al. ................ 220/4.14 |

* cited by examiner

Primary Examiner—Joseph C. Merek
(74) Attorney, Agent, or Firm—McGinn & Gibb, PLLC

(57) ABSTRACT

A resin member has a first barrel member 30, which can be welded to the fuel tank, and a second barrel member having a higher melting temperature than the first barrel member. The first barrel member is joined to the outer circumference of the second barrel member and protrudes at one axial end. The second barrel member protrudes at the other axial end. A bolt is inserted from one end where the first barrel member protrudes through the second barrel member out of an end face where the second barrel member protrudes. The first barrel member of the resin member is welded to the fuel tank. The bolt is inserted into a mounting hole of the heat insulation plate and securely fastened. A flange spreading diametrically is preferably formed on a protruding end face of the second barrel member.

6 Claims, 3 Drawing Sheets

HEAT INSULATION PLATE MOUNTING STRUCTURE ON FUEL TANK

The present disclosure relates to the subject matter contained in Japanese Patent Application No. 2002-105284 filed on Apr. 8, 2002, which is incorporated herein by reference in its entirety.

BACKGROUND OF THE INVENTION

1. Field of the Invention

The present invention relates to a heat insulation plate mounting structure on a fuel tank, for mounting a heat insulation plate in a predetermined region of a fuel tank made of resin.

2. Description of the Related Art

In recent years, a fuel tank made of resin has been utilized for the vehicles. The tank made of resin has sufficient strength, and has lighter weight than a metallic tank, with an advantage that there is no problem with the occurrence of rust. The tank made of resin is composed of a polyethylene single layer or a multi-layer of polyethylene and other resins in which the outermost layer is at least made of polyethylene.

However, some members of a vehicle such as an engine or a muffler are heated to high temperatures. If they are disposed close to the tank made of resin, there is a danger that the tank is thermally damaged and deformed or pitted-with hole. When the member heated to high temperatures is located near the tank, the heat insulation plate made of a metallic plate is disposed between the tank and the member heated to high temperatures. This heat insulation plate is curved to the almost same shape as the tank surface, and mounted on the tank with a certain gap.

A conventional structure for mounting this heat insulation plate on the fuel tank is well known in which a bolt is inserted into a barrel member made of polyethylene, with an end portion of the bolt protruding from one end of the barrel member and the other end of the barrel member being welded to the surface of the fuel tank, so that the bolt is fixed to the surface of the fuel tank to mount the heat insulation plate.

However, in the conventional structure for mounting the heat insulation plate on the fuel tank, the barrel member made of polyethylene has a relatively low melting point and is weak to heat. Therefore, there was a fear that the barrel member might be deformed due to heat transmitted from the heat insulation plate or bolt, or fall away from the tank surface.

SUMMARY OF THE INVENTION

Accordingly, it is an object of the invention to provide a structure for mounting the heat insulation plate on the fuel tank made of resin, with excellent heat resistance, in which the heat insulation plate is securely held.

In order to accomplish the above object, according to a first aspect of the invention, a structure for mounting a heat insulation plate on a fuel tank, includes the fuel tank made of resin, the heat insulation plate, a resin member welded to the fuel tank, a bolt attached to the resin member. The heat insulation plate is mounted on the fuel tank through the resin member and the bold. The resin member includes a first barrel member weldable to the fuel tank and a second barrel member having higher melting point than the first barrel member. The first barrel member is joined to an outer periphery of the second barrel member. A part of the first barrel member protrudes from one end of the resin member in an axial direction. A part of the second barrel member protrudes from the other end of the resin member in the axial direction. The bolt is inserted into the resin member from the one end side so that the bolt passes through inside of the second barrel member and protrudes from the other end. An end face of the part of the first barrel member is welded to the fuel tank.

With the first aspect, the bolt is inserted through the second barrel member having a higher melting temperature than the first barrel member to protrude from the end face of the second barrel member and the heat insulation plate is attached to a protruding portion of the bolt. Therefore, the heat of the heat insulation plate and bolt is transmitted to the second barrel member but not directly transmitted to the first barrel member. As a result, the resin member is not deformed or does not fall out even if the heat insulation plate and the bolt are heated at high temperatures and the heat insulation plate is securely held.

According to a second aspect of the invention, in the first aspect, a flange spreading in an outer-diameter direction is formed at an end face of the part of the second barrel member.

With the second aspect, since the flange spreading diametrically is formed on the protruding end face of the second barrel member, the heat insulation plate is supported on a wide surface of the flange. The heat of the heat insulation plate is prevented from being directly radiated to the first barrel member. Therefore, the first barrel member is effectively protected from thermal damage.

According to a third aspect of the invention, in the first or second aspect, a reduced-diameter step portion is formed in an outer periphery of the part of the first barrel member.

With the third aspect, when the protruding end portion of the first barrel member is welded to the fuel tank, the molten resin is prevented from jutting out around the outer circumference of the first barrel member to look unattractive, and easily welded to the fuel tank made of resin.

According to a fourth aspect of the invention, in any one of the first to third aspects, the first barrel member is made of polyethylene type resin. The second barrel member is made of polyamide type resin.

With the fourth aspect, the first barrel member, which is made of polyethylene type resin, is easily welded to the surface of the fuel tank made of resin. The second barrel member, which is made of polyamide type resin, retains sufficient heat resistance and strength.

According to a fifth aspect of the invention, in any one of the first to fourth aspects, the first and second barrel members are jointed to each other by insert-molding the first barrel member around the second barrel member, which has been formed in advance.

With the fifth aspect, even if the resin for the first barrel member and the resin for the second barrel member are not welded with each other, they are securely joined by insert molding.

According to a sixth aspect of the invention, a gap is formed between a head portion of the bolt and the fuel tank.

With the sixth aspect, the head portion of the bolt does not directly contact with the fuel tank. Therefore, the fuel tank is prevented from being thermally damaged due to heat of the bolt.

BRIEF DESCRIPTION OF THE DRAWINGS

FIG. 3 is a view showing the resin member with bolt, in which

DETAILED DESCRIPTION OF THE PREFERRED EMBODIMENTS

Figure 1:
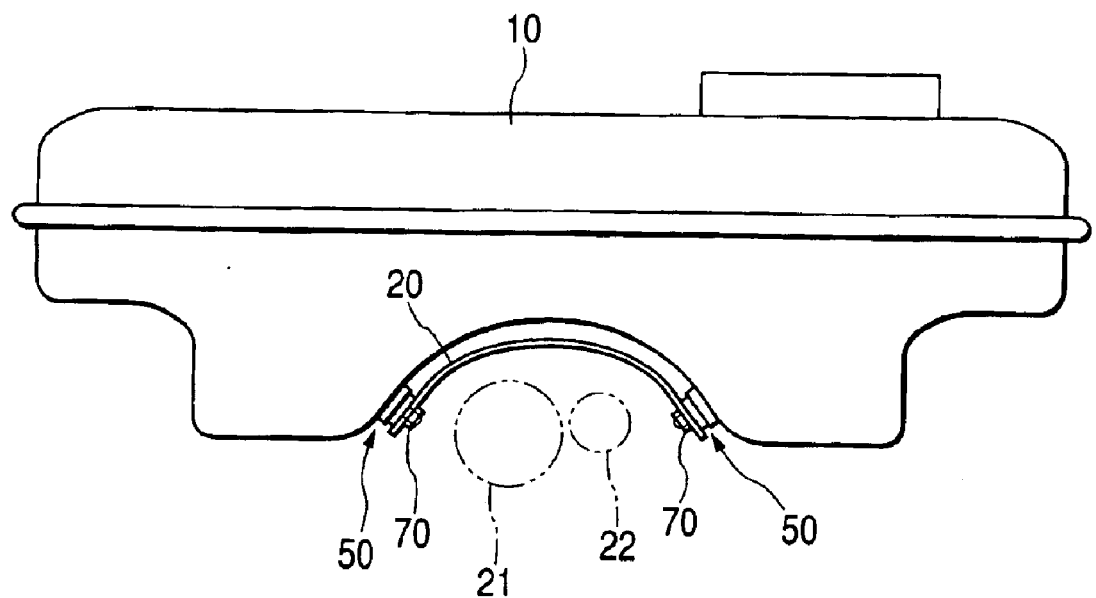
FIG. 1 is a plan view showing a structure for mounting a heat insulation plate to a fuel tank according to one embodiment of the present invention.
Figure 2:
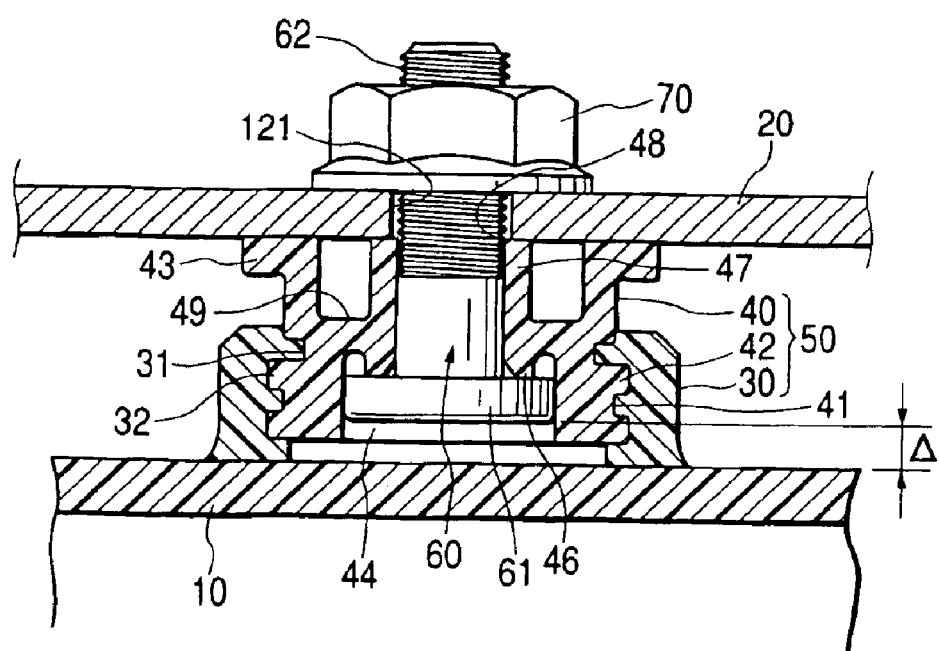
FIG. 2 is a cross-sectional view showing the essence of the mounting structure in enlargement.
Figure 3A:
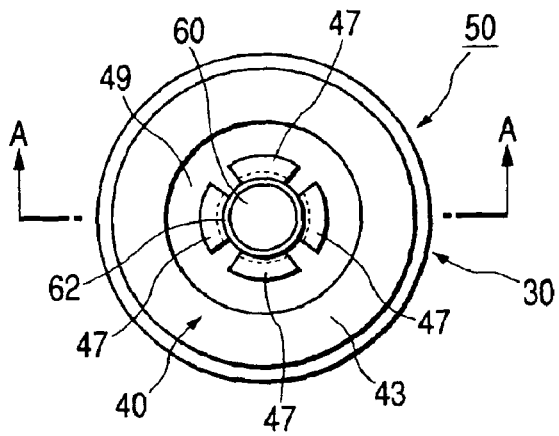
FIG. 3A is a plan view.
Figure 3B:
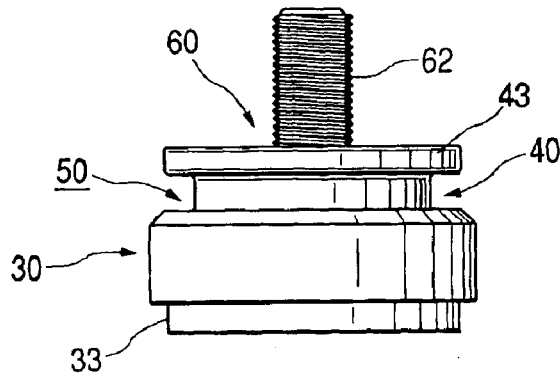
FIG. 3B is a front view.
Figure 3D:
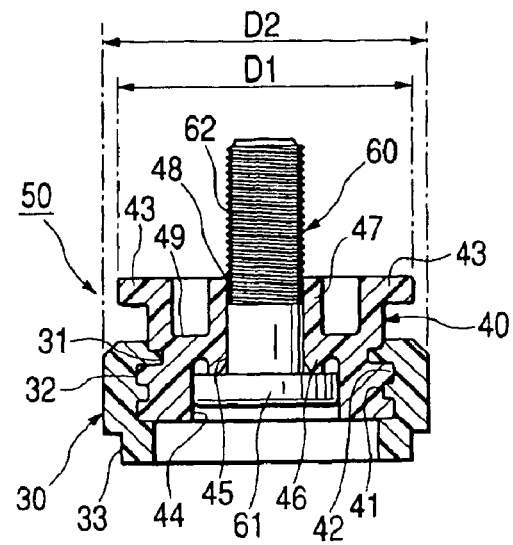
FIG. 3C is a bottom view and FIG. 3D is a cross-sectional view taken along the line A—A in FIG. 3A.
Figure 3C:
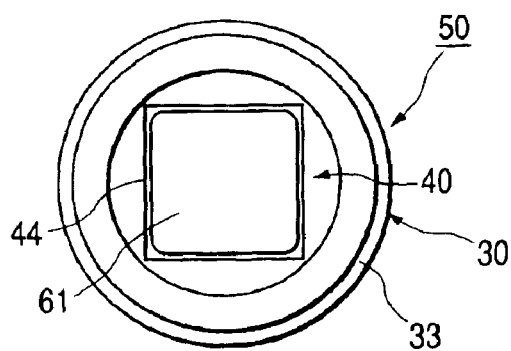
Figure 4:
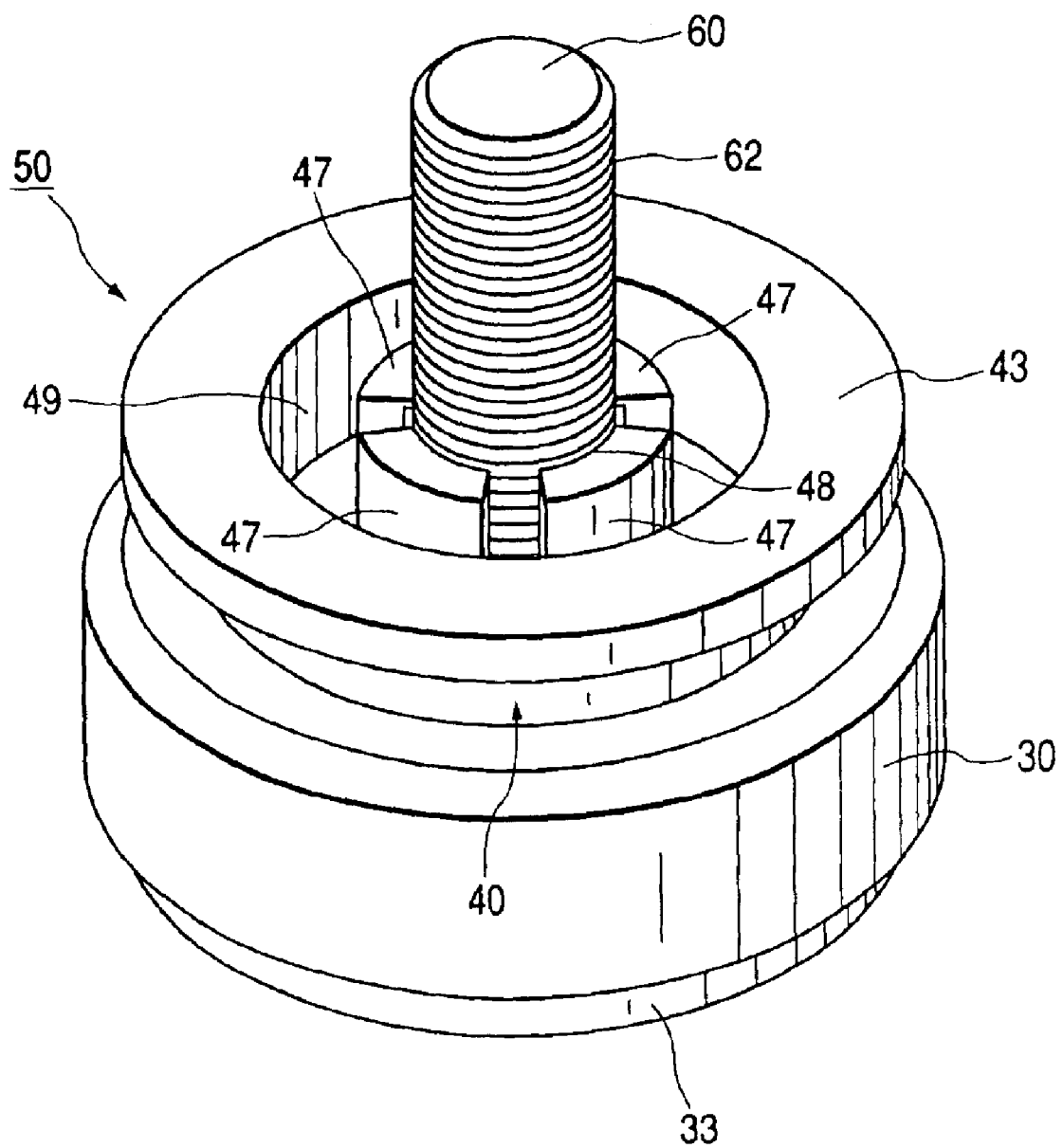
FIG. 4 is a perspective view showing a resin member with bolt for use in the same mounting structure.

FIGS. 1 to 4 show a structure for mounting a heat insulation plate on a fuel tank according to one embodiment of the present invention. FIG. 1 is a plan view showing a state where the heat insulation plate is mounted on the fuel tank. FIG. 2 is a cross-sectional view showing the essence of the mounting structure in enlargement. FIG. 3 is a view showing the resin member with bolt, in which FIG. 3A is a plan view, FIG. 3B is a front view, FIG. 3C is a bottom view and FIG. 3D is a cross-sectional view taken along the line A—A in FIG. 3A. FIG. 4 is a perspective view showing a resin member with bolt for use in the same mounting structure.

As shown in FIG. 1, the invention relates to the structure for mounting the heat insulation plate 20 made of a metallic plate on the fuel tank 10 made of resin. The fuel tank 10 preferably includes a single layer of polyethylene, for example, or a multi-layer of polyethylene and other resins in which the outermost layer being made of polyethylene. Although the heat insulation plate 20 is preferably a metallic plate such as an iron or aluminum steel plate, the heat insulation plate 20 may be a plate formed from an inorganic fiber.

The members 21 and 22 with high temperatures, such as an exhaust pipe for engine and a radiator pipe, may be disposed near the fuel tank 10. If directly subjected to heat from these high temperature members, there is a fear that the fuel tank 10 is thermally deformed. Therefore, the heat insulation plate 20 is disposed between the members 21 and 22 with high temperatures and the fuel tank 10. The heat insulation plate 20 is supported with a certain gap from the surface of the fuel tank 10 along a surface shape of the fuel tank 10.

As shown in FIG. 2, the heat insulation plate 20 is mounted on the fuel tank 10, using a resin member 50 fixed to the fuel tank 10, a bolt 60 inserted through this resin member 50 and held, and a nut 70 screwed around the bolt 60.

Referring to FIGS. 3 and 4, the resin member 50 includes a first barrel member 30 welded to the fuel tank 10 and a second barrel member 40 joined to the inner circumference of the first barrel member 30. The first barrel member 30 protrudes at one axial end thereof (lower end in FIGS. 2 and 4). The second barrel member 40 protrudes at the other axial end thereof (upper end in FIGS. 2 and 4).

The first barrel member 30 is made of resin that can be welded to the fuel tank 10, preferably polyethylene resin. For example, a modified polyolefine type resin may be employed such as "Modic AP" (trade name, made by Mitsubishi Chemical Corporation) or "Admar" (trade name, made by Mitsui Chemical INC).

The second barrel member 40 is made of resin having a higher melting point than the first barrel member 30 and a superior heat resistance than the first barrel member 30. Preferably polyamide type resin, polybutylene terephthalate type resin, polycarbonate type resin, or polyacetal type resin is used for the second barrel member 40, for example. Polyamide type resin is, for example, nylon 6, nylon 66, nylon 11, nylon 12, nylon 42, or the like. Also, the second barrel member 40 is preferably made of reinforced resin containing inorganic fiber such as glass fiber.

The first barrel member 30 and the second barrel member 40 are joined by a so-called insert molding in which the second barrel member 40 is molded in advance and is placed within a mold, and the first barrel member 30 is injection-molded. Also, a method such as two-color molding may be employed.

In this case, because both resins may not be fundamentally bonded, it is preferable that irregularity is formed on the composition surfaces of both to join both resins mechanically. In this embodiment, an annular concave portion 41 and an annular convex portion 42 formed around the outer circumference of the second barrel member 40 are fitted into an annular convex portion 31 and an annular concave portion 32 formed around the inner circumference of the first barrel member 30. As a result, the first and second barrel members 30, 40 are joined mechanically.

The first barrel member 30 has a reduced diameter step portion 33 around the outer circumference of its protruding end portion in a state before being welded to the fuel tank 10. When the first barrel member 30 is welded to the fuel tank 10 as shown in FIG. 2, the reduced diameter step portion 33 is filled with molten resin to prevent that the molten resin is overflowed outside. Accordingly, the reduced diameter step portion 33 hardly appears in a state of being welded to the fuel tank 10.

The second barrel member 40 has a flange 43 spreading in an outer-diameter direction at its protruding end portion. This flange 43 stably supports the heat insulation plate 20 with a wider area, and prevents head radiated from the heat insulation plate 20 from being directly applied to the first barrel member 30 to protect the first barrel member 30 from thermal damage. For this purpose, the diameter D1 of the flange 43 in FIG. 3 is preferably 0.7 to 2 times the outer diameter D2 of the first barrel member 30.

A concave portion 44 fitted by a head portion 61 of the bolt 60 is formed in the inner circumference of the end portion of the second barrel member 40, the end portion being on a side where the second barrel member 40 is joined to the first barrel member 30. The bolt 60 has the head portion 61 fitted into the concave portion 44 to provide a detent.

Moreover, an insertion hole 45 for inserting the bolt 60 is formed in the center of the concave portion 44 of the second barrel member 40. A rib 46 is formed around the periphery of the insertion hole 45 on the side of the concave portion 44.

A concave portion 49 is formed around the inner circumference at the protruding end portion of the second barrel member 40. On the edge portion of the insertion hole 45 to which this concave portion 49 opens to, resilient pieces 47 divided into four are stood to surround a thread part 62 of the bolt 60 to be inserted. A top end portion of each resilient piece 47 is formed with a pawl 48 for biting into the thread part 62.

Accordingly, if the bolt 60 is inserted into the insertion hole 45 from the side of the concave portion 44 to fit the head portion 61 of the bolt 60 into the concave portion 44 and push the thread part 62 of the bolt 60 into a space surrounded by the resilient pieces 47, the pawl 48 at the top end of the resilient piece 47 bites into the thread part 62 to engage and hold the bolt 60. In this case, a position of the end face of the head portion 61 of the bolt 60 is set such that the head portion 61 of the bolt 60 does not directly contact with the fuel tank 10 when the first barrel member 30 is welded to the fuel tank 10.

With the above structure for mounting the heat insulation plate, in mounting the heat insulation plate 20 on the fuel tank 10, first of all, the bolt 60 is inserted through the resin member 50 and held in the above manner, and the protruding end portion of the resin member 50 from the first barrel member 30 is welded to the fuel tank 10. The first barrel member 30 is made of a resin material, such as polyethylene resin, which can be welded to the fuel tank 10. Therefore, the resin member 50 is securely fixed to the fuel tank 10.

Then, the thread part 62 of the bolt 60 protruding from the protruding end face of the second barrel member 40 is inserted into the mounting hole 121 of the heat insulation plate 20, and the nut 70 is screwed around the thread part 61 and tightened. Consequently, the heat insulation plate 20 abuts against the flange 43 of the second barrel member 40 and is securely supported.

Thus, the heat insulation plate 20 mounted shields the heat radiated from the members 21 and 22 with high temperatures, which are disposed near the fuel tank 10, to prevent the fuel tank 10 from being thermally deformed.

The heat insulation plate 20 makes contact with the flange 43 of the second barrel member 40 with high heat resistance but does not directly contact with the first barrel member 30 with a relatively low melting point. Also, the bolt 60 for fixing the heat insulation plate 20 is inserted into the second barrel member 40, but does not directly contact with the first barrel member 30. Thereby, the first barrel member 30 is prevented from being molten or deformed. Also, the heat of the heat insulation plate 20 is reduced to some extent by the flange 43 of the second barrel member 40. As a result, the first barrel member 30 is securely prevented from being thermally deformed.

Moreover, there is formed a gap Δ (see FIG. 2) between an end face of the head portion 61 of the bolt 60 and the fuel tank 10, so that the head portion 61 of the bolt 60 does not directly contact with the fuel tank 10, whereby the fuel tank 10 is prevented from being thermally damaged due to heat of the bolt 60.

As above described, according to the invention, the heat of the heat insulation plate and bolt is transmitted to the second barrel member having higher melting temperature, but not directly transmitted to the first barrel member. Therefore, the resin member is not deformed or does not fall out even if the heat insulation plate and the bolt are at high temperatures, and the heat insulation plate is securely held.

What is claimed is:

1. A structure for mounting a heat insulation plate on a fuel tank, the structure comprising:

the fuel tank made of resin;

the heat insulation plate;

a resin member welded to the fuel tank;

a bolt attached to the resin member, wherein:

the heat insulation plate is mounted on the fuel tank through the resin member and the bolt;

the resin member includes:
   a first barrel member weldable to the fuel tank;
   a second barrel member having higher melting point than the first barrel member;

the first barrel member is joined to an outer periphery of the second barrel member;

a part of the first barrel member protrudes from one end of the resin member in an axial direction;

a part of the second barrel member protrudes from the other end of the resin member in the axial direction;

the bolt is inserted into the resin member from the one end side so that the bolt passes through inside of the second barrel member and protrudes from the other end; and an end face of the part of the first barrel member is welded to the fuel tank.

2. The structure according to claim 1, wherein a flange spreading in an outer-diameter direction is formed at an end face of the part of the second barrel member.

3. The structure according to claim 1, wherein a reduced-diameter step portion is formed in an outer periphery of the part of the first barrel member.

4. The structure according to claim 1, wherein:

the first barrel member is made of polyethylene type resin; and the second barrel member is made of polyamide type resin.

5. The structure according to claim 1, wherein the first and second barrel members are jointed to each other by insert-molding the first barrel member around the second barrel member, which has been formed in advance.

6. The structure according to claim 1, wherein a gap is formed between a head portion of the bolt and the fuel tank.

* * * * *